(12) United States Patent
Chen et al.

(10) Patent No.: US 9,743,218 B2
(45) Date of Patent: Aug. 22, 2017

(54) PROXY CONNECTION METHOD AND APPARATUS

(71) Applicant: Nokia Technologies Oy, Espoo (FI)

(72) Inventors: Canfeng Chen, Beijing (CN); Jia Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/440,008

(22) PCT Filed: Nov. 7, 2012

(86) PCT No.: PCT/CN2012/084209
§ 371 (c)(1),
(2) Date: Apr. 30, 2015

(87) PCT Pub. No.: WO2014/071564
PCT Pub. Date: May 15, 2014

(65) Prior Publication Data
US 2015/0304803 A1    Oct. 22, 2015

(51) Int. Cl.
*H04B 7/00* (2006.01)
*H04W 4/00* (2009.01)
*H04W 76/02* (2009.01)
*H04W 52/02* (2009.01)
(Continued)

(52) U.S. Cl.
CPC ....... *H04W 4/008* (2013.01); *H04W 52/0209* (2013.01); *H04W 76/02* (2013.01);
(Continued)

(58) Field of Classification Search
CPC .. H04L 67/28; H04W 4/008; H04W 52/0209; H04W 76/02; H04W 84/04; H04W 84/18
(Continued)

(56) References Cited

U.S. PATENT DOCUMENTS

| 5,907,540 A | 5/1999 | Hayashi |
| 6,718,159 B1 | 4/2004 | Sato |
| (Continued) | | |

FOREIGN PATENT DOCUMENTS

| CN | 1798354 | 7/2006 |
| CN | 101098180 | 1/2008 |
| (Continued) | | |

OTHER PUBLICATIONS

International Search Report and Written Opinion received for corresponding Patent Cooperation Treaty Application No. PCT/CN2012/084209 , dated Aug. 15, 2013, 11 pages.
(Continued)

*Primary Examiner* — Eugene Yun
(74) *Attorney, Agent, or Firm* — Locke Lord LLP

(57) ABSTRACT

Apparatus has at least one processor and at least one memory having computer-readable code stored therein which when executed controls the at least one processor: to respond to receiving a proxy connection initiation request message from a source, the proxy connection initiation request message being a request to provide a proxy and including an address of a target and an address of the source, by causing sending of an advertising message addressed to the target; and to respond subsequently to receiving a connection request message from the target by causing sending of a proxy setup request message addressed to the source.

28 Claims, 9 Drawing Sheets

(51) Int. Cl.
 *H04W 84/04* (2009.01)
 *H04W 84/18* (2009.01)

(52) U.S. Cl.
 CPC ............ *H04W 84/04* (2013.01); *H04W 84/18* (2013.01); *Y02B 60/50* (2013.01)

(58) Field of Classification Search
 USPC ........................................................ 455/41.2
 See application file for complete search history.

(56) References Cited

U.S. PATENT DOCUMENTS 6,968,153 B1   11/2005   Heinonen et al.

2011/0231651 A1*   9/2011   Bollay .................. H04L 63/166
                                                                 713/152
2012/0322466 A1*  12/2012   Das ....................... H04W 8/005
                                                                 455/458

FOREIGN PATENT DOCUMENTS

JP   2004147017   5/2004
JP   2009246419   10/2009

OTHER PUBLICATIONS

Extended European Search Report for European Patent Application No. 12888043.2, Dated Jun. 1, 2016, 8 pages.

* cited by examiner

| Payload | |
|---|---|
| TgtA (6 octets) | |
| AdvA (6 octets) | |

Fig. 3

| Payload | | |
|---|---|---|
| PrxA (6 octets) | AdvA (6 octets) | LLData (22 octets) |

Fig. 4

PROXY CONNECTION METHOD AND APPARATUS

RELATED APPLICATION

This application was originally filed as PCT Application No. PCT/CN2012/084209 filed Nov. 7, 2012.

FIELD

The present application relates to proxy connections. In particular, although not exclusively, it relates to the field of Bluetooth communications and more specifically to Bluetooth Low Energy.

BACKGROUND

Bluetooth Low Energy (BLE) is a new wireless communication technology published by the Bluetooth SIG as a component of Bluetooth Core Specification Version 4.0 BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY

Various aspects of examples of the invention are set out in the claims.

A first aspect of the present invention provides apparatus configured:
- to respond to receiving a proxy connection initiation request message from a source, the proxy connection initiation request message being a request to provide a proxy and including an address of a target and an address of the source, by causing sending of an advertising message addressed to the target; and
- to respond subsequently to receiving a connection request message from the target by causing sending of a proxy setup request message addressed to the source.

The apparatus may be configured to respond to receiving the connection request message from the target by connecting to the target.

The apparatus may be configured to connect to the source following causing sending of the proxy setup request message addressed to the source.

The apparatus may be configured to cause addition of an address relating to the source and an address relating to the target to a record in a database. This apparatus may be configured to respond to detecting ceasing of the connection with the source and/or the target by causing updating of the record in the database. Alternatively or additionally the apparatus may be configured to respond to receiving a first data packet after connection to the source by extracting an address relating to a sender of the first data packet, using the address relating to the sender to identify the record in the database, extracting an address relating to a recipient from the identified record in the database, and generating a second data packet including a payload included in the first data packet and addressed to the recipient with the address relating to the recipient extracted from the record in the database.

The apparatus may be configured to respond to detecting ceasing of the connection with the source by causing disconnection of the connection with the target.

The apparatus may be configured to respond to detecting ceasing of the connection with the target by causing disconnection of the connection with the source.

The apparatus may be configured to scan for proxy connection initiation request messages. The apparatus may be configured to scan for proxy connection initiation request messages when a proxy mode setting is enabled and to refrain from scanning for proxy connection initiation request messages when a proxy mode setting is disabled.

The apparatus may be configured:
- to respond to receiving the proxy connection initiation request message by determining whether the address of the source included in the proxy connection initiation request message is included in a list of permitted addresses;
- to cause sending of the advertising message addressed to the target if the address of the source included in the proxy connection initiation request message is included in the list of permitted addresses; and
- to refrain from sending the advertising message addressed to the target if the address of the source included in the proxy connection initiation request message is not included in the list of permitted addresses.

The apparatus may be configured, subsequent to receiving the connection request message from the target, to respond to receiving a further proxy connection initiation request message from the source by causing sending of the proxy setup request message addressed to the source.

The address of the target may be included in a payload of the proxy connection initiation request.

The address of the source may be included in a payload of the proxy connection initiation request.

The apparatus may be configured to include an address of the apparatus and an address of the source in the proxy setup request message.

The apparatus may be configured to include data for connection setup in a payload of the proxy setup request message.

The advertising message may be an ADV_DIRECT_IND PDU.

The connection request message may be a CONNECT_REQ PDU.

The proxy connection initiation request message may be encapsulated in a Bluetooth Low Energy Link Layer packet.

The proxy setup request message may be encapsulated in a Bluetooth Low Energy Link Layer packet.

A second aspect of the invention provides apparatus configured:
- to send one or more advertising messages addressed to a target using an address of the target;
- to respond to determining that no response to the advertising message has been received from the target by sending a proxy connection initiation request message, the proxy connection initiation request message being a request to provide a proxy and including the address of the target and an address of the apparatus; and
- to respond to receiving a proxy setup request message from a proxy, the proxy setup request message being addressed to the apparatus, by connecting to the proxy device.

The apparatus may be configured to send advertising messages addressed to a target using an address of the target repeatedly until it is detected that a first timeout has expired or that a response has been received from the target.

The apparatus may be configured to send proxy connection initiation request messages repeatedly until it is detected that a second timeout has expired or that the proxy setup request message has been received from the proxy.

The apparatus may be configured to read an address of the proxy from the received proxy setup request message, and to connect to the proxy device conditional on the address of the proxy being included in a list of permitted proxy addresses.

The apparatus may be configured to include the address of the target in a payload of the proxy connection initiation request.

The apparatus may be configured to include the address of the apparatus in a payload of the proxy connection initiation request.

The proxy setup request message may include an address of the proxy and an address of the apparatus.

The proxy setup request message may include data for connection setup in a payload thereof.

The advertising message may be an ADV_DIRECT_IND PDU.

The connection request message may be a CONNECT_REQ PDU.

The proxy connection initiation request message may be encapsulated in a Bluetooth Low Energy Link Layer packet.

The proxy setup request message may be encapsulated in a Bluetooth Low Energy Link Layer packet.

A third aspect of the invention provides a method comprising:
responding to receiving a proxy connection initiation request message from a source, the proxy connection initiation request message being a request to provide a proxy and including an address of a target and an address of the source, by causing sending of an advertising message addressed to the target; and
responding subsequently to receiving a connection request message from the target by causing sending of a proxy setup request message addressed to the source.

The method may comprise responding to receiving the connection request message from the target by connecting to the target.

The method may comprise connecting to the source following causing sending of the proxy setup request message addressed to the source.

The method may comprise causing addition of an address relating to the source and an address relating to the target to a record in a database.

The method may comprise responding to detecting ceasing of the connection with the source and/or the target by causing updating of the record in the database.

The method may comprise responding to receiving a first data packet after connection to the source by extracting an address relating to a sender of the first data packet, using the address relating to the sender to identify the record in the database, extracting an address relating to a recipient from the identified record in the database, and generating a second data packet including a payload included in the first data packet and addressed to the recipient with the address relating to the recipient extracted from the record in the database.

The method may comprise responding to detecting ceasing of the connection with the source by causing disconnection of the connection with the target.

The method may comprise responding to detecting ceasing of the connection with the target by causing disconnection of the connection with the source.

The method may comprise scanning for proxy connection initiation request messages.

The method may comprise scanning for proxy connection initiation request messages when a proxy mode setting is enabled and refraining from scanning for proxy connection initiation request messages when a proxy mode setting is disabled.

The method may comprise:
responding to receiving the proxy connection initiation request message by determining whether the address of the source included in the proxy connection initiation request message is included in a list of permitted addresses;
causing sending of the advertising message addressed to the target if the address of the source included in the proxy connection initiation request message is included in the list of permitted addresses; and
refraining from sending the advertising message addressed to the target if the address of the source included in the proxy connection initiation request message is not included in the list of permitted addresses.

The method may comprise, subsequent to receiving the connection request message from the target, responding to receiving a further proxy connection initiation request message from the source by causing sending of the proxy setup request message addressed to the source.

The address of the target may be included in a payload of the proxy connection initiation request.

The address of the source may be included in a payload of the proxy connection initiation request.

The method may comprise including an address of the apparatus and an address of the source in the proxy setup request message.

The method may comprise including data for connection setup in a payload of the proxy setup request message.

The advertising message may be an ADV_DIRECT_IND PDU.

The connection request message may be a CONNECT_REQ PDU.

The proxy connection initiation request message may be encapsulated in a Bluetooth Low Energy Link Layer packet.

The proxy setup request message may be encapsulated in a Bluetooth Low Energy Link Layer packet.

A fourth aspect of the invention provides a method comprising:
sending one or more advertising messages addressed to a target using an address of the target;
responding to determining that no response to the advertising message has been received from the target by sending a proxy connection initiation request message, the proxy connection initiation request message being a request to provide a proxy and including the address of the target and an address of the apparatus; and
responding to receiving a proxy setup request message from a proxy, the proxy setup request message being addressed to the apparatus, by connecting to the proxy device.

The method may comprise sending advertising messages addressed to a target using an address of the target repeatedly until it is detected that a first timeout has expired or that a response has been received from the target.

The method may comprise sending proxy connection initiation request messages repeatedly until it is detected that a second timeout has expired or that the proxy setup request message has been received from the proxy.

The method may comprise reading an address of the proxy from the received proxy setup request message, and connecting to the proxy device conditional on the address of the proxy being included in a list of permitted proxy addresses.

The method may comprise including the address of the target in a payload of the proxy connection initiation request.

The method may comprise including the address of the apparatus in a payload of the proxy connection initiation request.

The proxy setup request message may include an address of the proxy and an address of the apparatus.

The proxy setup request message may include data for connection setup in a payload thereof.

The advertising message may be an ADV_DIRECT_IND PDU.

The connection request message may be a CONNECT_REQ PDU.

The proxy connection initiation request message may be encapsulated in a Bluetooth Low Energy Link Layer packet.

The proxy setup request message may be encapsulated in a Bluetooth Low Energy Link Layer packet.

A fifth aspect of the invention provides a computer program comprising instructions that when executed by a computer apparatus control it to perform the method above.

A sixth aspect of the invention provides a non-transitory computer-readable storage medium having stored thereon computer-readable code, which, when executed by computing apparatus, causes said computing apparatus to perform a method comprising:
  responding to receiving a proxy connection initiation request message from a source, said proxy connection initiation request message being a request to provide a proxy and including an address of a target and an address of said source, by causing sending of an advertising message addressed to said target; and
  responding subsequently to receiving a connection request message from said target by causing sending of a proxy setup request message addressed to said source.

A seventh aspect of the invention provides a non-transitory computer-readable storage medium having stored thereon computer-readable code, which, when executed by computing apparatus, causes said computing apparatus to perform a method comprising:
  sending one or more advertising messages addressed to a target using an address of said target;
  responding to determining that no response to said advertising message has been received from said target by sending a proxy connection initiation request message, said proxy connection initiation request message being a request to provide a proxy and including said address of said target and an address of said apparatus; and
  responding to receiving a proxy setup request message from a proxy, said proxy setup request message being addressed to said apparatus, by connecting to said proxy device.

An eighth aspect of the invention provides apparatus, said apparatus having at least one processor and at least one memory having computer-readable code stored therein which when executed controls said at least one processor:
  to respond to receiving a proxy connection initiation request message from a source, said proxy connection initiation request message being a request to provide a proxy and including an address of a target and an address of said source, by causing sending of an advertising message addressed to said target; and
  to respond subsequently to receiving a connection request message from said target by causing sending of a proxy setup request message addressed to said source.

Said computer-readable code when executed may control said at least one processor to respond to receiving said connection request message from said target by connecting to said target.

Said computer-readable code when executed may control said at least one processor to connect to said source following causing sending of said proxy setup request message addressed to said source.

Said computer-readable code when executed may control said at least one processor to cause addition of an address relating to said source and an address relating to said target to a record in a database.

Said computer-readable code when executed may control said at least one processor to respond to detecting ceasing of said connection with said source and/or said target by causing updating of said record in said database.

Said computer-readable code when executed may control said at least one processor to respond to receiving a first data packet after connection to said source by extracting an address relating to a sender of said first data packet, using said address relating to said sender to identify said record in said database, extracting an address relating to a recipient from said identified record in said database, and generating a second data packet including a payload included in said first data packet and addressed to said recipient with said address relating to said recipient extracted from said record in said database.

Said computer-readable code when executed may control said at least one processor to respond to detecting ceasing of said connection with said source by causing disconnection of said connection with said target.

Said computer-readable code when executed may control said at least one processor to respond to detecting ceasing of said connection with said target by causing disconnection of said connection with said source.

Said computer-readable code when executed may control said at least one processor to scan for proxy connection initiation request messages.

Said computer-readable code when executed may control said at least one processor to scan for proxy connection initiation request messages when a proxy mode setting is enabled and to refrain from scanning for proxy connection initiation request messages when a proxy mode setting is disabled.

Said computer-readable code when executed may control said at least one processor:
  to respond to receiving said proxy connection initiation request message by determining whether said address of said source included in said proxy connection initiation request message is included in a list of permitted addresses;
  to cause sending of said advertising message addressed to said target if said address of said source included in said proxy connection initiation request message is included in said list of permitted addresses; and
  to refrain from sending said advertising message addressed to said target if said address of said source included in said proxy connection initiation request message is not included in said list of permitted addresses.

Said computer-readable code when executed may control said at least one processor, subsequent to receiving said connection request message from said target, to respond to receiving a further proxy connection initiation request message from said source by causing sending of said proxy setup request message addressed to said source.

Said address of said target is included in a payload of said proxy connection initiation request.

Said address of said source is included in a payload of said proxy connection initiation request.

Said computer-readable code when executed may control said at least one processor to include an address of said apparatus and an address of said source in said proxy setup request message.

Said computer-readable code when executed may control said at least one processor to include data for connection setup in a payload of said proxy setup request message.

Said advertising message may be an ADV_DIRECT_IND PDU.

Said connection request message may be a CONNECT_REQ PDU.

Said proxy connection initiation request message may be encapsulated in a Bluetooth Low Energy Link Layer packet.

Said proxy setup request message may be encapsulated in a Bluetooth Low Energy Link Layer packet.

A ninth aspect of the present invention provides apparatus, said apparatus having at least one processor and at least one memory having computer-readable code therein which when executed may control said at least one processor:
  to send one or more advertising messages addressed to a target using an address of said target;
  to respond to determining that no response to said advertising message has been received from said target by sending a proxy connection initiation request message said proxy connection initiation request message being a request to provide a proxy and including said address of said target and an address of said apparatus; and
  to respond to receiving a proxy setup request message from a proxy, said proxy setup request message being addressed to said apparatus, by connecting to said proxy device.

Said computer-readable code when executed may control said at least one processor to send advertising messages addressed to a target using an address of said target repeatedly until it is detected that a first timeout has expired or that a response has been received from said target.

Said computer-readable code when executed may control said at least one processor to send proxy connection initiation request messages repeatedly until it is detected that a second timeout has expired or that said proxy setup request message has been received from said proxy.

Said computer-readable code when executed may control said at least one processor to read an address of said proxy from said received proxy setup request message, and to connect to said proxy device conditional on said address of said proxy being included in a list of permitted proxy addresses.

Said computer-readable code when executed may control said at least one processor to include said address of said target in a payload of said proxy connection initiation request.

Said computer-readable code when executed may control said at least one processor to include said address of said apparatus in a payload of said proxy connection initiation request.

Said proxy setup request message includes an address of said proxy and an address of said apparatus.

Said proxy setup request message includes data for connection setup in a payload thereof.

Said advertising message may be an ADV_DIRECT_IND PDU.

Said connection request message may be a CONNECT_REQ PDU.

Said proxy connection initiation request message may be encapsulated in a Bluetooth Low Energy Link Layer packet.

Said proxy setup request message may be encapsulated in a Bluetooth Low Energy Link Layer packet.

BRIEF DESCRIPTION OF THE DRAWINGS

For a more complete understanding of example embodiments of the present invention, reference is now made to the following descriptions taken in connection with the accompanying drawings in which:

FIG. 3 shows a payload of a proxy connection initiation request message used in embodiments of the invention;

FIG. 4 shows a payload of a proxy setup request message used in embodiments of the invention;

DETAILED DESCRIPTION OF VARIOUS EMBODIMENTS

The following acronyms are used in the specification and have the meanings referred to:
  BLE: Bluetooth Low Energy
  LE: Low Energy
  BT SIG: Bluetooth Special Interest Group
  RFU: Reserved for Future Use The latest version of the BLE specification defines three advertising channels, which serve for device discovery and other broadcasting purpose. To identify BLE devices, two important identifies—Device Address and Device Name are highly relied upon.

According to the BLE specification, packets sent in the advertising channels (index=37, 38 and 39) shall contain the device addresses, which are used to identify a LE device. There are two types of device addresses: public device address and random device address, each of them is 48 bits in length, and a device shall contain at least one type of device address and may contain both.

Public Device Address

The content of a public device address contains two fields:
  company_assigned field is in the 24 least significant bits
  company_id field is in the 24 most significant bits The public device address shall be created in accordance with section 9.2 ("48-bit universal LAN MAC addresses") of the IEEE 802-2001 standard (http://standards.ieee.org/ getieee802/download/802-2001.pdf) and using a valid Organizationally Unique Identifier (OUT) obtained from the IEEE Registration Authority (see http://standards.ieee.org/regauth/oui/forms/and sections 9 and 9.1 of the IEEE 802-2001 specification).

Random Device Address

A random device address is divided into the following two fields:

hash field is in the 24 least significant bits random field is in the 24 most significant bits The detailed specification of the hash field and random field can be found in BT Spec. v4.0, Vol. 3, Part C, Section 10.8.2.3 and Section 10.8.2.2, respectively.

On the other hand, the Generic Access Profile (GAP) also provides a Local Name AD Type to contain the device name in the BLE advertising data (BT Specification. v4.0, Vol. 3, Part C, Section 11.1.2).

Figure 1:
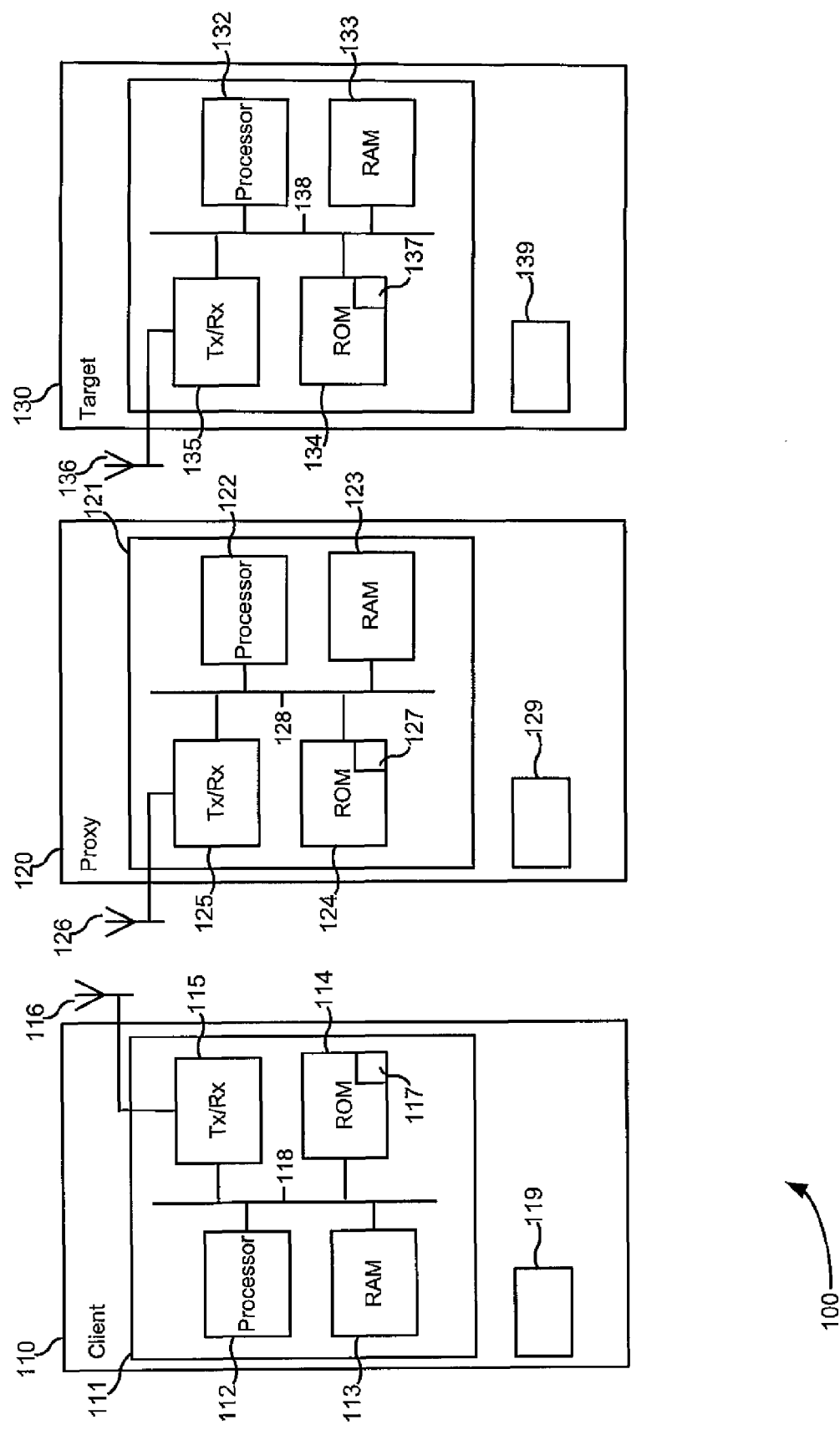
FIG. 1 is a schematic diagram of three devices that are used to discuss various embodiments of the invention.

FIG. 1 shows a system including components according to embodiments of the invention. The system 100 includes a client device 110, a proxy device 120 and a target device 130. The client device 110 includes a Bluetooth Low Energy (BLE) module which operates according to the BLE standard, currently at version 4.0. The proxy device 120 includes a BLE module 121, which also operates according to the BLE standard. The target device 130 includes a BLE module 131, which also operates according to the BLE standard.

Each of the BLE modules 111, 121, 131 is substantially the same, so only one will be described here. The BLE module in of the client terminal 110 includes a processor 112. The processor 112 is connected to volatile memory such as RAM 113 by a bus 118. The bus 118 also connects the processor 112 and the RAM 113 to non-volatile memory, such as ROM 114. A transceiver 115 is coupled to the bus 118, and thus also to the processor 112 and the memories 113, 114. An antenna 116 is coupled to the transceiver 115. Within the ROM 114 is stored a computer program 117. This may be in the form of firmware. Alternatively, it may be in the form of an operating system and one or more applications, for instance.

In the BLE module 121 of the proxy device 120, a processor 122, RAM 123, ROM 124, a transceiver 125, an antenna 126, software 127 and a bus 128 are constituted and connected in the same way as in the corresponding components of the BLE module iii. Similarly, in the target module 130, the BLE module 131 includes a processor 132, RAM 133, ROM 134, a transceiver 135, an antenna 136, software 137 and a bus 138 having the same functions and connections as the corresponding components in the BLE module in of the client device 110.

Each of the BLE modules 111, 121, 131 may take any suitable form. Generally speaking, the BLE module in of the client device 110 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the BLE module in.

In addition to the BLE module 111, the client terminal 110 comprises a number of components which are indicated together at 119. These components 119 may include any suitable combination of a display, a user input interface, a communication interface, a speaker, a microphone, and a camera. The components 119 may include a processor arrangement, a volatile memory (e.g. RAM) and non-volatile memory (e.g. ROM), connected to the processor arrangement. The proxy terminal 120 comprises a number of such components which are indicated together at 129. The target terminal 130 comprises a number of such components which are indicated together at 139.

The terminals 110, 120, 130 may be mobile phones, smart phones, tablet computers, laptop computers etc. The terminals 110, 120, 130 may be based around any suitable operating system, for instance the Symbian operating system or Microsoft Windows operating system, although any other operating system may instead be used. The terminals 110, 120, 130 may run different operating systems.

Each of the BLE modules 111, 121, 131 is configured to communicate with other BLE or Bluetooth modules. Basic operation of the modules is the same.

Generally speaking, embodiments of the invention allow a Bluetooth connection between the client device 110 and the target device 130 by way of the proxy device 120. To achieve this, the client device 110 and the proxy device 120 each operate differently to conventional operation. Through the different operation, the client device 110 may have a Bluetooth connection with a target device 130 even though the devices may not be within range of one another such that they can form a Bluetooth connection directly.

Briefly, the client device 110 is configured to transmit a new kind of advertising channel packet data unit (PDU). In response to receiving a certain advertising PDU from the client device 110, the proxy device 120 sends an advertising PDU to the target device 130. Thereafter, the proxy device 120 acts as a go-between for the client device 110 and the target device 130.

Embodiments of the present invention provide an extension to the current Bluetooth standard in three ways. The first is that it moves away from peer-to-peer connection set-up, which is the only connection set-up that is possible with the current Bluetooth standard. The second is to extend the limited transmission range (of approximately 50 metres) which is inherent in the current Bluetooth standard. The third is to provide routing capability, which is currently absent from the Bluetooth standard.

When a BLE packet is transmitted in an advertising physical channel, the PDU shall be the Advertising Channel PDU. When a packet is transmitted in a data physical channel, the PDU shall be the Data Channel PDU. A general advertising channel PDU will now be described with reference to FIG. 2. After the general description of the PDU, it will be described what differences there are between PDUs used in embodiments of this invention and other PDUs.

Figure 2:
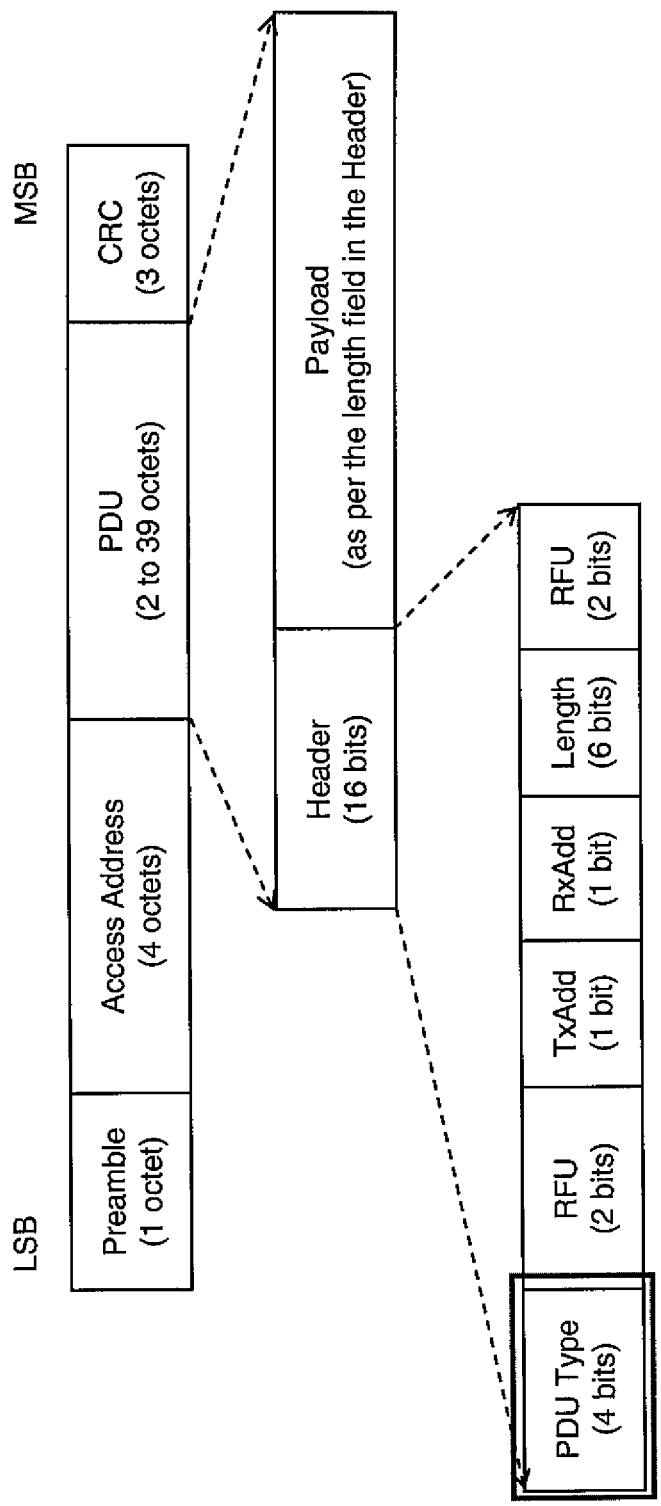
FIG. 2 presents the format of an Advertising Channel PDU used in embodiments of the invention.

In a BLE embodiment, the format of link layer packet that contains the Advertising Channel PDU is shown in FIG. 2. The PDU is encapsulated in the link layer packet.

As shown in FIG. 2, there are four main components to the message. The first part is a preamble. The second part is an Access Address. The third part is a packet data unit (PDU). The fourth part is a cyclic redundancy check (CRC). Here, the preamble is one octet (eight data bits, also known as one byte). The Access Address is four octets, generated by the device in the Initiating State and will be used in data channel packets to distinguish each Link Layer connection between any two devices (BT Specification. v4.0, Vol. 6, Part B, Section 2.1.2). The PDU is between two and 39 octets. The CRC is three octets.

As shown in FIG. 2, the PDU includes two main sections. The first is the header, and the second is the payload. The header here has 16 bits (two octets). The payload has a length that is between zero and 37 octets, as per the length field in the header part of the PDU.

The header is shown in FIG. 2 as being divided into six fields. The PDU type field comprises four bits. A first reserved for future use (RFU) field comprises two bits. A TxAdd field is one bit. An RxAdd field is one bit. The Length field includes six bits. The sixth field is a second RFU field which includes two bits.

The RFU bits in the header of the PDU are reserved for future use (RFU) in version 4.0 of the BLE specification.

In this embodiment, two new PDU Types are provided. The formats of the PDU Types are as follows:

| PDU Type ($b_3b_2b_1b_0$) | Packet Name |
|---|---|
| 0111 (or other reserved number) | ADV_PROXY_IND |
| 1000 (or other reserved number) | PROXY_REQ |

The current BLE specification defines several types of advertising channel PDU, e.g., ADV_IND (ob0000), ADV_DIRECT_IND (ob0001), and CONNECT_REQ (ob0101) (see Bluetooth V4.0, Vol. 6, Part B, Sec. 2.3).

The payload section of the PDU may include different fields, in accordance to the specification of different types of Advertising PDU. For example, the ADV_IND PDU includes two fields. The first is six octets long and is called AdvA. The second part is between zero and 31 octets long and is called AdvData. For another example, the ADV_DIRECT_IND PDU includes two fields. The first is six octets long and is called AdvA. The second part is six octets long and is called InitA.

Figure 3:
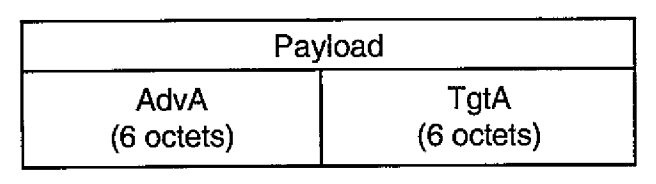

FIG. 3 shows the payload of the ADV_PROXY_IND PDU. This payload, which is referred to as the Payload field in FIG. 2, is the detailed format when the PDU Type filed is set to 0111.

The payload of ADV_PROXY_IND PDU consists of two fields: AdvA and TgtA.

The AdvA field includes the address of the advertiser. The AdvA field contains either the advertiser's public or random device address. Which address is included is indicated by the value in the TxAdd field. In the embodiment described with reference to FIG. 1, the advertiser is the client device 110.

The TgtA field is the address of the target with which the advertiser is attempting to connect. The TgtA field contains the public or random device address of the target. Which address is included is indicated by the value in the RxAdd field. In the embodiment described with reference to FIG. 1, the target is the target device 130.

FIG. 4 shows the payload of the PROXY_REQ PDU. This payload, which is referred to as the Payload field in FIG. 2, is the detailed format when the PDU Type filed is set to 1000.

The payload of PROXY_REQ PDU consists of three fields: PrxA, AdvA and LLData.

The PrxA field contains the initiator's public or random device address. Which address is included is indicated by the value in the TxAdd field. In the embodiment described with reference to FIG. 1, the initiator is the proxy device 120.

The AdvA field contains the advertiser's public or random device address. Which address is included is indicated by the value in the RxAdd field.

The LLData field contains specific data for connection setup, which assemble those contained in the CONNECTREQ_PDU (see Bluetooth V4.0, Vol. 6, Part B, Sec. 2.3.3.1, FIG. 2.11).

Operation of the various devices in providing a proxy-based connection between the client device 110 and the target device 130 will now be described with reference to FIGS. 5 to 9.

Figure 5:
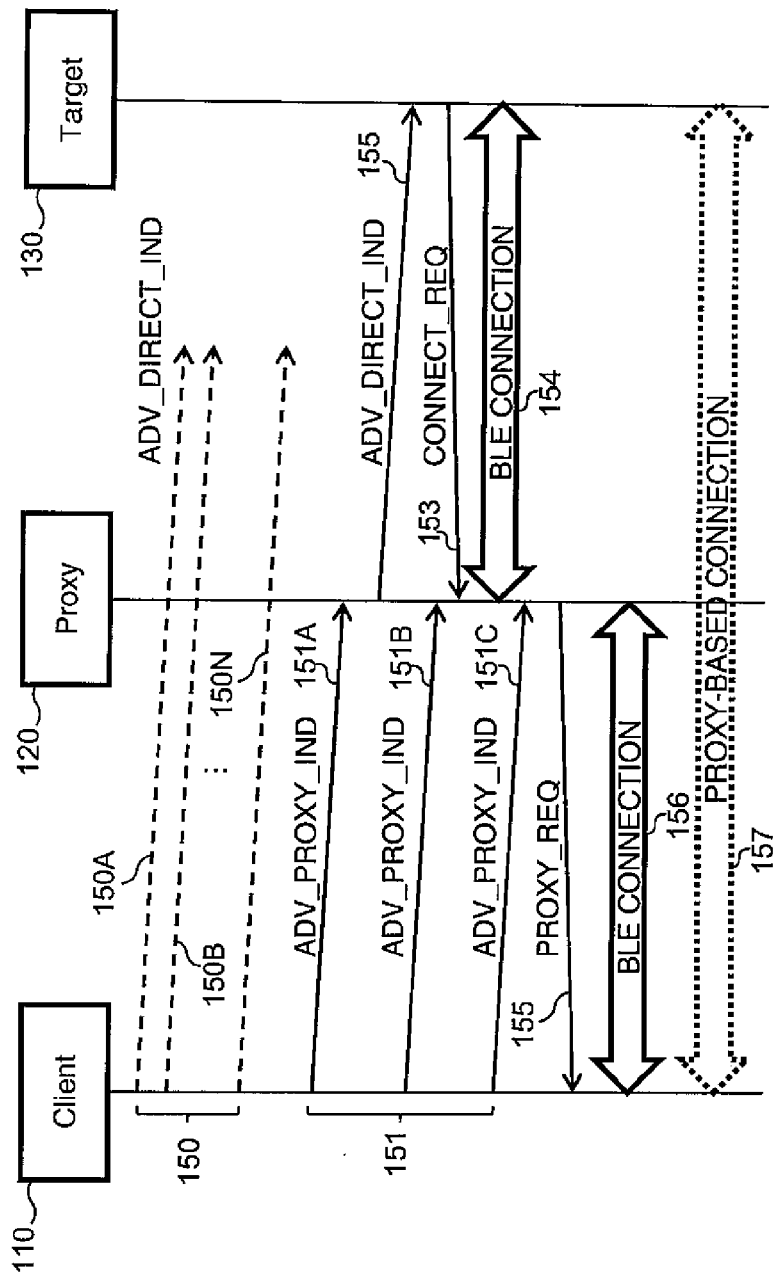
FIG. 5 is a signaling diagram and illustrates operation of the three devices of FIG. 1 according to various aspects of the invention.

Reference is made firstly to FIG. 5. Here, the client device 110 intends to communicate with the target device 130. However, the radio propagation conditions between the client device 110 and the target device 130 are such that direct communication cannot be established between these devices. The proxy device 120 has reachability to both the client device 110 and the target device 130. The proxy device 120 may act as an intermediary to assist the client device 110 accessing the target device 130.

Initially, the client device 110 transmits direct advertising messages 150A. These are PDUs of the ADVDIRECT_IND_PDU Type. The ADV_DIRECT_IND PDUs are addressed to the target device 130 in the sense that they include the address of the target device 130 in the InitA field of the PDU. Because the target device 130 is out of range of the client device 110, none of the ADV_DIRECT_IND PDU messages reaches the target device 130.

After the client device 110 has detected that a number of ADV_DIRECT_IND PDU messages have been transmitted without a response from the target device 130, the client device 110 stops sending ADV_DIRECT_IND PDU messages 150 and instead starts sending ADV_PROXY_IND PDU messages 151. These messages are configured as described above. As such, the PDU Type field is populated with the data that is reserved for the ADV_PROXY_IND PDU (in this example 0111). Also, the AdvA field in the payload of the ADV_PROXY_IND PDU includes the address of the client device 110. The TgtA field in the payload of the ADV_PROXY_IND PDU includes the address of the target device 130 with which the client device 110 is attempting to connect.

The proxy 120 responds to receiving an ADV_PROXY_IND PDU 151 from the client device 110 by sending an ADV_DIRECT_IND PDU 152, which is then received at the target 130. The ADV_DIRECT_IND PDU 152 may take any suitable form and may for instance take the form mandated by the BLE specification. The ADV_DIRECT_IND PDU is addressed to the target device 130 by including the address of the target device that was received in the TgtA field of the ADV_PROXY_IND PDU 151 in the InitA field of the ADV_DIRECT_IND PDU.

In response to receiving the ADV_DIRECT_IND PDU 152, the target 130 sends a CONNECT_REQ PDU 153 to the proxy 120. The CONNECT_REQ PDU 153 may take any suitable form, and may for instance take the form specified in section 2.3 of part B of Bluetooth v4.0.

Following receipt of the CONNECT_REQ PDU 153 by the proxy device 120, a BLE connection 154 is established between the proxy device 120 and the target device 130.

After having received the CONNECT_REQ PDU 153 from the target device 130, the proxy device 120 waits until it receives another ADV_PROXY_IND PDU 151 from the client device 110. Upon receiving the next ADV_PROXY_IND PDU 151, the proxy device 120 sends a PROXY_REQ PDU 155 to the client device 110. The PROXY_REQ PDU 155 takes the form specified above. In particular, the PDU Type field in the PROXY_REQ PDU includes 1000, or whatever other number is assigned to the PROXY_REQ PDU. The PROXY_REQ PDU 155 includes the address of the proxy device 120 in the PrxA field. Whether the address is the public or random address is indicated by data included in the TxAdd field. The AdvA field includes the address of the client device 110. Whether this is the public or random address is indicated by the data stored in RxAdd. The LLData field includes specific data for connection setup. The specific data for the connection setup that is included in the LLData field corresponds to the data included in the CONNECT_REQ PDU 153, although it instead relates to the connection between the proxy device 120 and the client device 110.

Upon receiving the PROXY_REQ PDU 155, a BLE connection 156 is established between the client no and the proxy device 120.

By virtue of the BLE connection 156 between the client device 110 and the proxy device 120 and the other BLE connection 154 between the proxy device 120 and the target device 130, a proxy-based connection 157 is established between the client device no and the target device 130.

In this proxy-based connection 157, there are a number of things to note. The first is that the proxy device 120 acts as a High Anonymity proxy between the client device no and the target device 130. Secondly, the client device 110 connects to the proxy 120 as through it is connecting to the target device 130. Put another way, once the BLE connection 156 is established between the client device 110 and the proxy device 120, the client device 110 transmits and receives packets as though it were connected directly to the target device 130. Thirdly, the target device 130 is unaware of the existence of the client device 110 and does not know the accessing activities of the client device 110, but considers that it is communicating with a proxy device 120. Put another way, once the BLE connection 154 is established between the proxy device 120 and the target device 130, the target device 130 has an anonymous connection, but not a transparent connection, to the client device 110.

Figure 6:
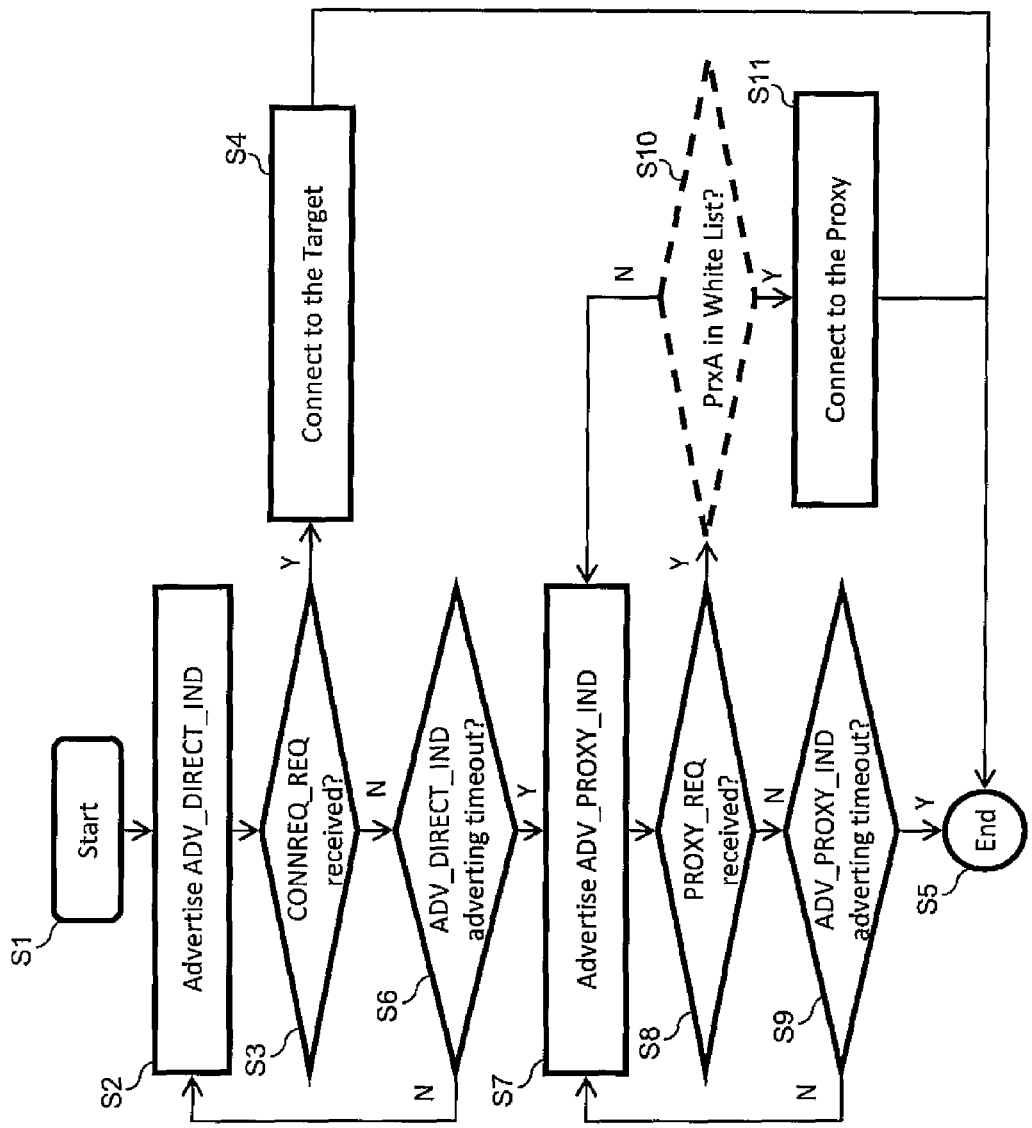
FIG. 6 is a flow chart illustrating operation of the client device of FIG. 1 when setting up a proxy connection according to various aspects of the invention.

FIG. 6 illustrates steps taken by the client device 110 in the process of setting up the proxy-based connection 157 with the target device 130.

The operation starts at step S1.

At step S2, the client device 110 sends the ADV_DIRECT_IND PDU 150. At step S3, it is determined whether a CONNECT_REQ PDU has been received. Such a PDU will be received where the target device 130 is within range of the client device 110. In the event of a positive determination, at step S4 the client device 110 connects to the target device 130. After step S4, the operation ends at step S5.

If a CONNECT_REQ PDU is not received at step S3, at step S6 it is determined whether an advertising timeout has expired. The timeout may be expressed in terms of a measure of time or in terms of a number of ADV_DIRECT_IND messages. If the timeout has not expired, the operation returns to step S2, where another ADV_DIRECT_IND message is transmitted. Steps S2, S3 and S6 are repeated until either a CONNECT_REQ PDU message 153 is determined to have been received at step S3 or the advertising timeout is determined to have expired at step S6.

Once the timeout expires at step S6, at step S7 an ADV_PROXY_IND PDU 151 is sent by the client device 110. At step S8, it is then determined whether a PROXY_REQ PDU 155 has been received. On a negative determination, at step S9 it is determined whether an advertising timeout has expired. The timeout of step S9 may be expressed as a measure of time or as a measure of a number of PROXY_REQ messages. If the timeout has not expired, the operation returns to step S7, where another ADV_PROXY_IND PDU is transmitted.

If at step S9 it is determined that the timeout has expired, the operation proceeds to step S5, where it ends.

Steps S7, S8 and S9 are repeated until either it is determined at step S9 that the timeout has expired or it is determined at step S8 that a PROXY_REQ PDU has been received.

On a positive determination at step S8, the operation proceeds to an optional step S10. Here, it is determined whether the PrxA that is included in the received PROXY_REQ PDU is included in a white list of permitted proxy devices 120. On a negative determination, the operation returns to step S7, where another ADV_PROXY_IND message is transmitted. On a positive determination, or if the optional step S10 is not present, at step S11 the client device 110 connects to the proxy device 120. Following connection at step S11, the operation ends at step S5.

The inclusion of step S10 and the checking of the PrxA identified in the PROXY_REQ PDU against the white list provides security for the client device 110. In particular, it ensures that a connection is made only to proxy devices 120 that are trustable by the client device 110, If a proxy device 110 that responds with a PROXY_REQ message is not trusted by the client device 110, no connection is made between the client device no and the proxy device 120.

The provision of steps S2, S3 and S6 has an effect that a proxy connection between the client device 110 and the target device 130 is made only if direct connection is not possible, or at least has not been achieved within the timeout that is applied by step S6. This helps to reduce unnecessary use of proxy devices 120.

Figure 7:
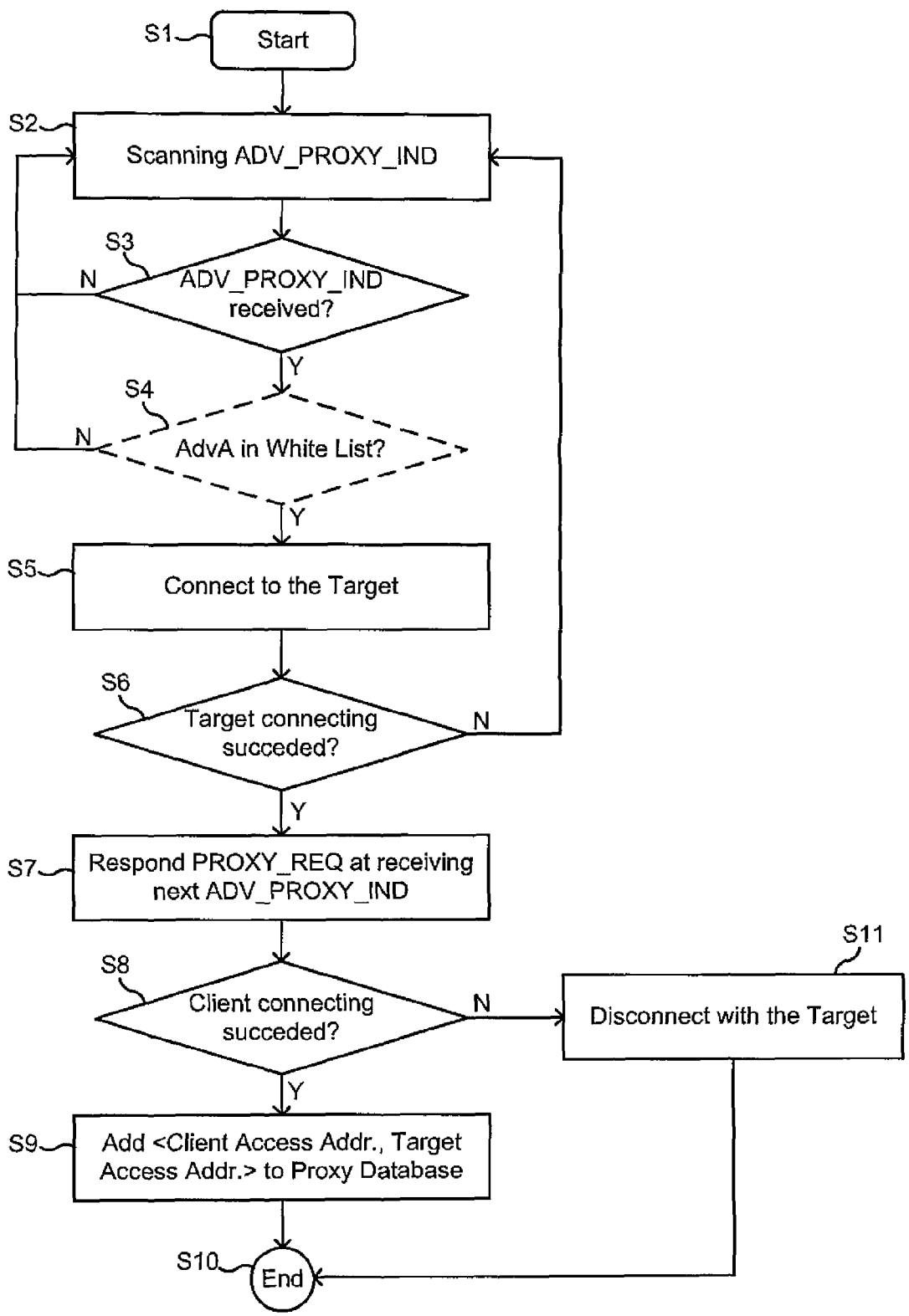
FIG. 7 is a flow chart illustrating operation of the proxy device of FIG. 1 when setting up a proxy connection according to various aspects of the invention.

Operation of the proxy device 120 during connection setup will now be descried with reference to FIG. 7.

Operation begins at step S1. At step S2, the proxy device 120 scans for ADV_PROXY_IND PDU messages. At step S3, it is determined whether an ADV_PROXY_IND PDU has been received. On a negative determination, the operation proceeds to step S2. As such, steps S2 and S3 are repeated until an ADV_PROXY_IND PDU is received.

On a positive determination from step S3, at step S4 it is determined whether an AdvA included in the received ADV_PROXY_IND PDU is in a white list contained within the proxy device 120. If the AdvA is not in the white list, the operation returns to step S2, where scanning is repeated. On a positive determination, the operation proceeds to step S5. It will be appreciated that step S4 is optional. If step S4 is omitted, a positive determination from step S3 proceeds directly to step S5.

At step S5, the proxy device 120 connects to the target device 130. This involves sending the ADV_DIRECT_IND PDU 152 that is shown in FIG. 5, and then receiving the CONNECT_REQ PDU 153 from the target device 130.

At step S6, it is determined whether connection with the target device 130 has succeeded. In the event of an unsuccessful connection, the operation returns to step S2, where scanning is repeated. If connection is determined to have succeeded, at step S7 the proxy device 120 responds to the client device 110 with a PROXY_REQ PDU 155 after receiving an ADV_PROXY_IND PDU 151 from the client device 110. This initiates a connection between the proxy device 120 and the client device 110.

At step S8, it is determined whether the proxy device 120 succeeded in connecting with the client device 110. On a positive determination, at step S9 the Client Access Address and the Target Access Address are added to a proxy database that is maintained within the proxy device 120. After step S9, the operation ends at step S10.

If it is determined at step S8 that the connection between the proxy device 120 and the client device 110 did not succeed, at step S10, the proxy device 120 disconnects with the target device 130. Following S11, the operation ends at step S10.

After connection setup is completed at step S10, the proxy based connection 157 is in place between the client device 110 and the target device 130 by way of the proxy device 120.

It will be noted that as a result of the connection setup process shown in FIG. 7, the proxy device 120 acts as a master to the client device 110 and acts as a slave device to the target 130. Thus, the proxy device 120 acts as a master and slave simultaneously. In regards to the proxy-based connection 157, the client 110 acts as a slave to the target device 130.

The proxy device 120 acting as a provider of the proxy-based connection 157 between the client device 110 and the target device 130 is not to the direct benefit of the proxy device 120 but instead benefits the client device 110 and the target device 130. Providing the proxy-based connection 157 presents a drain on battery resources of the proxy device 120, and potentially also other resources. Whilst providing the proxy-based connection 157, the proxy device 120 may be unable to connect to the client device 110 or the target device 130 by a Bluetooth connection for its own purposes. However, the proxy device 120 may connect to other Bluetooth devices except the client device 110 and the target device 130.

The proxy device 120 is configured to allow or disallow proxy-based connections by way of a setting. The setting may be changed by a user through a user interlace provided by the components 129. The setting may additionally be changed by an application or operating system of the proxy device 120. Allowing a user of the proxy device 120 to specify whether the proxy device 120 is able to provide a proxy-based connection 157 between other devices allows the user to control how the Bluetooth resources of the proxy device 120 are used. The proxy device 120 may be configured to allow the user to specify that use of the proxy device 120 to provide proxy-based connections 157 between other devices is enabled only when there is sufficient battery level remaining, and may be disabled when remaining battery level falls below a threshold, and to set the setting accordingly.

Operation of the proxy device 120 when forwarding data as part of the proxy-based connection 157 will now be described with reference to FIG. 8.

Operation begins at step S1. At step S2, a packet is retrieved from a receiving buffer of the proxy device 120. The receiving buffer may utilise a memory of the BLE module 121, for instance it may utilise the RAM 123.

At step S3, the Access Address data is extracted from the relevant field of the packet retrieved from the receiving buffer. At step S4, it is determined whether the data in the Access Address is found in the proxy database. The Access Address will be found in the proxy database if a proxy-based connection 157 was successfully connected and the data was added to the proxy database at step S9 of FIG. 7.

On a positive determination from step S4, the Access Address that is mapped to by the record that was found in the proxy database is obtained. At step S6, the payload of the packet retrieved from the receiving buffer at step S2 is extracted. At step S7, a new packet is generated. The new packet includes the payload that was extracted at step S6 and the mapped Access Address that was obtained at step S5. At step S8, the new packet is put into the sending buffer, after which it is transmitted from the proxy device 120.

Following step S8, the forwarding a data packet operation ends at step S9.

If a negative determination results from step S4, at step S10 normal packet processing is performed. Following step S10, preparation ends at step S9. At step S10, the received packet is not forwarded.

Figure 8:
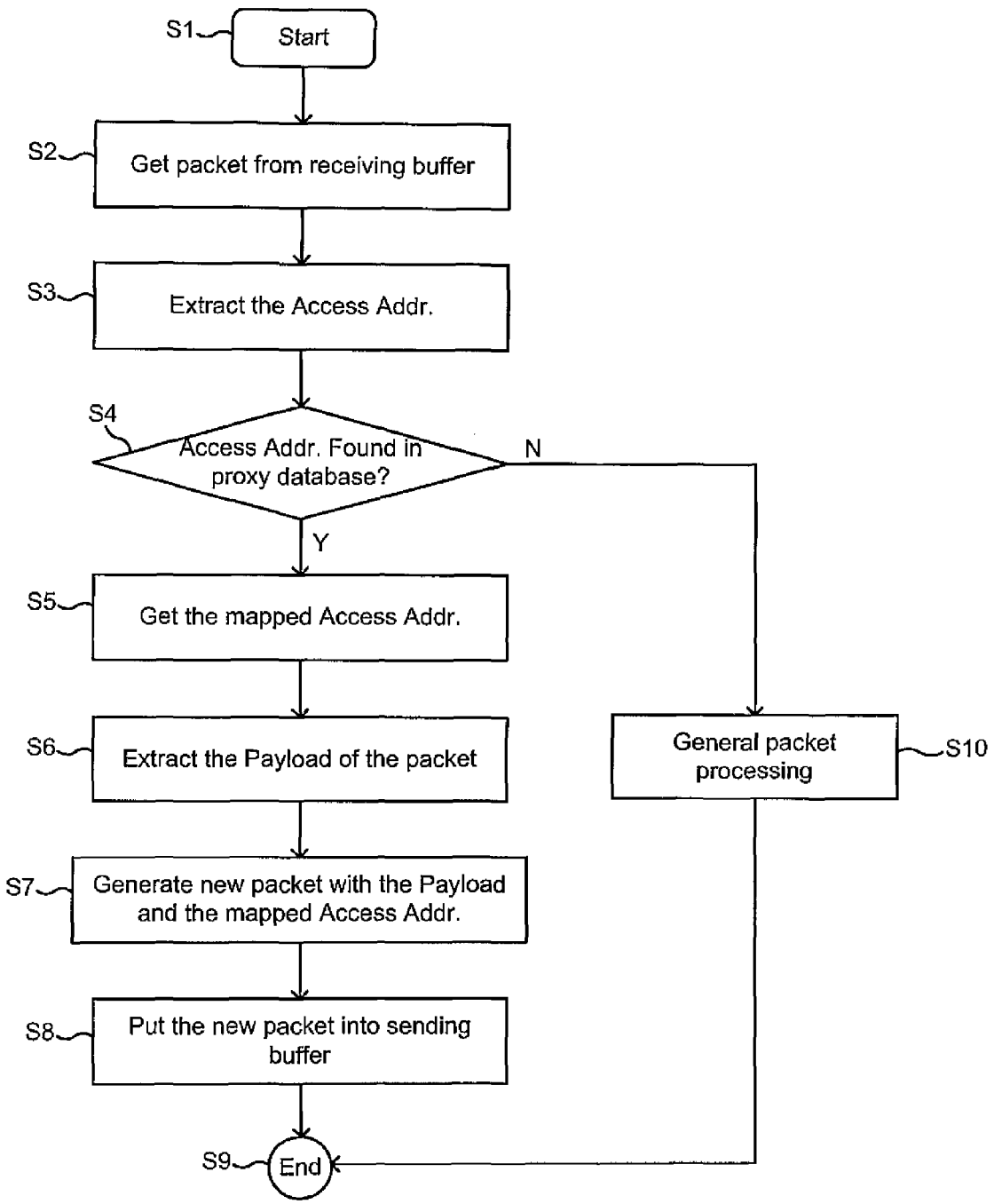
FIG. 8 is a flow chart illustrating operation of the proxy device of FIG. 1 when forwarding data packets according to various aspects of the invention.

It will be appreciated that the operation shown in FIG. 8 applies to packets that are received from the client device 110 and to packets that are received from the target device 130. In the situation where a received packet is from the client device 110 and is intended for the target device 130, the Access Address that is extracted at step S3 is different from the Access Address that is extracted in the event of receiving a packet from the target device 130 and directed to the client device 110. The mapped Access Address that is obtained at step S5 also depends on the direction in which the packet is travelling, namely from the client device 110 to the target device 130 or in the other direction. In particular it is the data from the opposite field of the record that is provided in each case.

Figure 9:
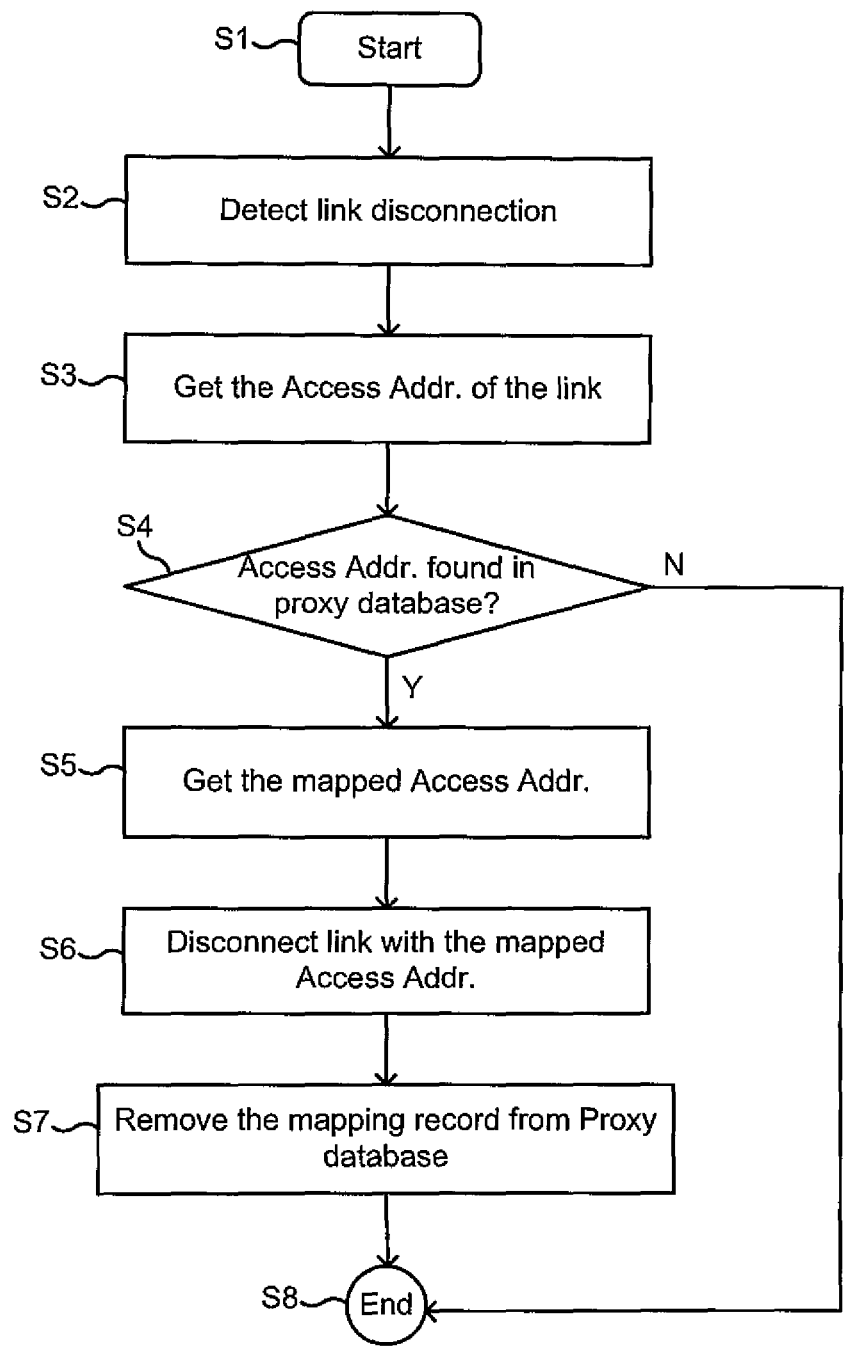
FIG. 9 is a flow chart illustrating operation of the proxy device of FIG. 1 when managing a proxy connection according to various aspects of the invention.

Operation of the proxy device 120 in connection management will now be described with reference to FIG. 9.

Operation begins at step S1. At step S2 link disconnection is detected. This can be disconnection of the BLE connection 156 between the proxy device 120 and the client no or the disconnection of the BLE connection 154 between the proxy device 120 and the target 130. At step S3, the Access Address of the link is obtained. At step S4 it is determined whether the Access Address is found in the proxy database. On a positive determination, the Access Address that is mapped by the record in the proxy database is obtained. At step S6, the link having the mapped Access Address is disconnected. In the event of the disconnection initially of the BLE connection 156, it is the BLE connection 154 between the proxy device 120 and the target device 130 that is disconnected at step S6. In the event of initial disconnection of the BLE connection 154 between the proxy device 120 and the target device 130, it is the BLE connection 156 between the proxy device 120 and the client device 110 that is disconnected at step S6.

At step S7, the record is removed from the proxy database. After step S7 or following a negative determination at step S4, the operation ends at step S8.

Connection management such as that described with reference to FIG. 9, particularly with reference to steps S2 and S6, provides the effect that connections that are no longer needed are disconnected, thereby freeing radio resources for the devices that would otherwise be connected and reducing power consumption etc. for those devices.

Removing the mapping record from the proxy database at step S7 has an effect of freeing memory resources within the proxy device 120. It also has an effect of helping to ensure correct operation of the proxy device 120 in the event of receiving a PDU that would otherwise result in action being taken by the proxy device 120. Such actions includes the forwarding of packets, as is described with reference to FIG. 8.

It is advantageous for proxy devices 120 continually to monitor link status. In this way, the termination of unneeded connections can be achieved quickly, thereby minimising the use of Bluetooth transceiver and battery etc. resources.

In BLE networks, the data link between any two BLE devices is identified only by an Access Address (AA), which is generated during the course of connection establishment. So, a proxy device 120, working for a client device 110 (say C1) and a target device 130 (say T1) has a mapping record <C1_AA, T1_AA> in the proxy database. When another client device 110 (say C2) is trying to access the same target device T1, then the proxy device 120 does not react to the ADVPROXY_IND PDUs from the another client device C2. If it did react, the proxy device 120 would connect to the another client device C2 resulting in another mapping record <C2_AA, T1_AA>, and would not be able to discriminate where the packet from the target device T1 should be forwarded.

If, on the other hand, the another client device C2 is trying to connect a different target device (say, T2), the proxy device 120 can respond to the another client device C2 in this case since there will be no confusion with a new mapping record <C2_AA, T2_AA> in the proxy database.

Therefore, the proxy device 120 may simultaneously provide a proxy connection for more than one pair of client device and target device, but only if they are different Bluetooth devices.

The value of the timeout provided in step S6 of FIG. 6 may take any suitable value. For instance, it may be 1.28 seconds. Clearly, the value of the timeout dictates the number of ADV_DIRECT_IND PDU messages 150 that are transmitted without establishing a connection. It also dictates the period before the client device attempts to initiate a proxy connection by sending ADV_PROXY_IND PDUs 151.

The value of the timeout in step S9 of FIG. 6 may take any suitable value. For instance, the value of the timeout may be 10 seconds. Clearly, the value of the timeout dictates the period of time in which proxy devices 120 have in order to set up a connection with the target device 130 and then respond to the client device 110. A higher timeout value gives proxy devices 120 a greater opportunity to take the necessary steps, although at the expense of an increased time before the client device 110 ceases trying to establish a proxy connection with the target device 130.

The interval of transmission of ADV_PROXY_IND PDUs 151, that are sent at step S7 of FIG. 6, may take any suitable value. For instance, the interval between successive messages may be one second. The lower the interval between successive messages, the greater the number of messages that are sent in a given time period. The more messages that are sent then the greater the probability that a proxy device 120 will have received the ADV_PROXY_IND PDU 151 from the client device 110 and been able to establish a connection with the target device 130. However, because the establishment of the BLE connection 154 between the proxy device 120 and the target device 130 necessarily takes some time, a high frequency of transmission of ADV_PROXY_IND PDUs 151 may utilise Bluetooth and battery etc. resources of the client device 110 with no benefit.

The above description does not address security of the BLE connections 156 and 154. Encryption may be applied to the BLE connection 156 between the client device 110 and the proxy device 120. Encryption may alternatively or in addition be provided to the BLE connection 154 between the proxy device 120 and the target device 130. Encryption need not be provided to both of the connections 154 and 156. However, if only one connection is encrypted and the other is not, packets may be eavesdropped by a device in the same general location as one of the linked devices.

The forwarding of data by the proxy device 120 that is described with reference to FIG. 8 applies to data channel PDUs. However, control channel PDUs are not forwarded by the proxy device 120. Instead, control channel PDUs relate to the specific connection 154 or 156 and are not relevant to the device 110, 130 that is not part of the specific connection. As such, control channel PDUs are not forwarded by the proxy device 120.

As the proxy device 120 has the role of a slave to the client device 110 and the role of a master to the target device 130, the proxy 120 is configured to forward received data channel PDUs with minimal delay. This helps to optimise the proxy-based connection 157 between the client device 110 and the target device 130. This may be achieved by checking the receiving buffer at step S2 of FIG. 8 frequently, and performing the remaining steps of FIG. 8 as a high priority once a packet is extracted from the receiving buffer.

The proxy device 120 may be configured to implement a multi-hop proxy-based connection. In these embodiments, the proxy 120 is configured differently to that described above. In these embodiments, in response to receiving an ADV_PROXY_IND PDU 151 from the client device 110, the proxy device 120 transmits ADV_DIRECT_IND PDUs 152 as shown in FIG. 5. Upon the proxy device 120 detecting that a CONNECT-REQ PDU 153 has not been received from the target device 130 within a period (which may be determined by a time-out), the proxy device 120 takes further steps. In particular, the proxy device 120 transmits ADV_PROXY_IND PDUs 151 that includes the address of the target device 130 in the relevant field. This then allows other proxy devices 120 to act in the way mentioned above with respect to the proxy device 120 to establish a BLE connection 154 with the target device 130. In this way, a proxy-based connection 157 can be established between a client device no and a first proxy device 120, through a second proxy device 120 to a target device 130. The second proxy device 120 in this situation acts in the same way as the proxy device 120 described in relation to the earlier embodiments. However, the first proxy device 120 operates a little differently, in particular by transmitting ADV_PROXY_IND PDUs 151 and receiving PROXY_REQ PDUs 155. In effect, the first proxy device 120 acts in some ways the same as the client no and in some ways the same as the second proxy device 120.

The scenario described above implements a two hop proxy-based connection. Three or more hop proxy based connections may be established where intervening proxy devices are configured to operate in the same way as the first proxy device 120 described above.

An effect of providing the proxy-based connection 157 with a single intervening proxy device 120 is an extension of the communication range. By allowing for additional hops, the communication range can be extended even further.

Some further details of components and features and alternatives for them will now be described.

The computer program instructions 117 may provide the logic and routines that enables the BLE module in to perform the functionality described below. The computer program instructions 117 may be pre-programmed into the BLE module 111. Alternatively, they may arrive at the BLE module 111 via an electromagnetic carrier signal or be copied from a physical entity such as a computer program product, a non-volatile electronic memory device (e.g. flash memory) or a record medium such as a CD-ROM or DVD.

The processing circuitry 112 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112 may be termed processing means.

Typically, the BLE module in comprises a processor 112 coupled connected to both volatile memory 113 and non-volatile memory 114. The computer program is stored in the non-volatile memory 114 and is executed by the processor 112 using the volatile memory 113 for temporary storage of data or data and instructions. Examples of volatile memory include RAM, DRAM, SDRAM etc. Examples of non-volatile memory include ROM, PROM, EEPROM, flash memory, optical storage, magnetic storage, etc.

The BLE module 111 may be a single integrated circuit. It may alternatively be provided as a set of integrated circuits (i.e. a chipset). The BLE module 111 may alternatively be a hardwired, application-specific integrated circuit (ASIC).

The components 119 may be arranged in any suitable way. For instance, there may be provided processing circuitry, including one or more processors, and a storage device, comprising a single memory unit or a plurality of memory units. The processing circuitry may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112 may be termed processing means. The storage device may store computer program instructions that, when loaded into the processing circuitry, control the operation of the client device 110. The computer program instructions may provide the logic and routines that enables the client device 110 to provide functions of the device that are not provided by the BLE module 111 on its own. The computer program instructions may be pre-programmed into the client device 110. Alternatively, they may arrive at the client device 110 via an electromagnetic carrier signal or be copied from a physical entity such as a computer program product, a non-volatile electronic memory device (e.g. flash memory) or a record medium such as a CD-ROM or DVD.

Typically, the components 119 of the client device 110 comprises a processor coupled connected to both volatile memory and non-volatile memory. The computer program is stored in the non-volatile memory and is executed by the processor using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories.

The communication interface may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 802.11 (Wi-Fi). Alternatively or additionally, the communication interface 114 may be configured for wired communication with a device or network.

The apparatus may comprise further optional SW components which are not described in this specification since they may not have direct interaction to embodiments of the invention.

Although the embodiments are described with reference to Bluetooth Low Energy, it will be appreciated that the concepts may be applicable to other communication protocols. For instance, other embodiments of the invention relate to versions of Bluetooth that are not concerned with the Bluetooth Low Energy aspect of the Bluetooth standard. Other embodiments relate instead to other communication protocols, which may take any suitable form of wireless protocol, whether radio, optical or other.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

The computer program instructions may arrive at the apparatus via an electromagnetic carrier signal or be copied from a physical entity such as a computer program product, a memory device or a record medium such as but not exclusively a CD-ROM or DVD, and/or an article of manufacture that tangibly embodies the computer program.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
responding, at a Bluetooth Low Energy (BLE)-enabled proxy device, to receiving a proxy connection initiation request message from a BLE-enabled source, the proxy connection initiation request message being a request to provide a proxy and including an address of a BLE-enabled target and an address of the source, by causing said proxy device to send a BLE advertising message addressed to the target; and
responding, at said proxy device, subsequently to receiving a BLE connection request message from the target by causing said proxy device to send a proxy setup request message addressed to the source.

2. An apparatus comprising a Bluetooth Low Energy (BLE)-enabled proxy device, said proxy device having at least one processor and at least one non-transitory memory having computer-readable code stored therein which when executed controls said at least one processor:
to respond, at said proxy device, to receiving a proxy connection initiation request message from a BLE-enabled source, said proxy connection initiation request message being a request to provide a proxy and including an address of a BLE-enabled target and an address of said source, by causing said proxy device to send a BLE advertising message addressed to said target; and
to respond, at said proxy device, subsequently to receiving a BLE connection request message from said target by causing said proxy device to send a proxy setup request message addressed to said source.

3. Apparatus as claimed in claim 2, wherein said computer-readable code when executed controls said at least one processor to respond to receiving said connection request message from said target by connecting to said target.

4. Apparatus as claimed in claim 2, wherein said computer-readable code when executed controls said at least one processor to connect to said source following causing sending of said proxy setup request message addressed to said source.

5. Apparatus as claimed in claim 2, wherein said computer-readable code when executed controls said at least one processor to cause addition of an address relating to said source and an address relating to said target to a record in a database.

6. Apparatus as claimed in claim 5, wherein said computer-readable code when executed controls said at least one processor to respond to detecting ceasing of said connection with said source and/or said target by causing updating of said record in said database.

7. Apparatus as claimed in claim 5, wherein said computer-readable code when executed controls said at least one processor to respond to receiving a first data packet after connection to said source by extracting an address relating to a sender of said first data packet, using said address relating to said sender to identify said record in said database, extracting an address relating to a recipient from said identified record in said database, and generating a second data packet including a payload included in said first data packet and addressed to said recipient with said address relating to said recipient extracted from said record in said database.

8. Apparatus as claimed in claim 2, wherein said computer-readable code when executed controls said at least one processor to respond to detecting ceasing of said connection with said source by causing disconnection of said connection with said target.

9. Apparatus as claimed in claim 2, wherein said computer-readable code when executed controls said at least one processor to respond to detecting ceasing of said connection with said target by causing disconnection of said connection with said source.

10. Apparatus as claimed in claim 2, wherein said computer-readable code when executed controls said at least one processor to scan for proxy connection initiation request messages.

11. Apparatus as claimed in claim 10, wherein said computer-readable code when executed controls said at least one processor to scan for proxy connection initiation request messages when a proxy mode setting is enabled and to refrain from scanning for proxy connection initiation request messages when a proxy mode setting is disabled.

12. Apparatus as claimed in claim 2, wherein said computer-readable code when executed controls said at least one processor:
to respond to receiving said proxy connection initiation request message by determining whether said address of said source included in said proxy connection initiation request message is included in a list of permitted addresses;
to cause sending of said advertising message addressed to said target if said address of said source included in said proxy connection initiation request message is included in said list of permitted addresses; and
to refrain from sending said advertising message addressed to said target if said address of said source included in said proxy connection initiation request message is not included in said list of permitted addresses.

13. Apparatus as claimed in claim 2, wherein said computer-readable code when executed controls said at least one processor, subsequent to receiving said connection request message from said target, to respond to receiving a further proxy connection initiation request message from said source by causing sending of said proxy setup request message addressed to said source.

14. Apparatus as claimed in claim 2, wherein at least one of the following:
a) said address of said target is included in a payload of said proxy connection initiation request, or
b) said address of said source is included in a payload of said proxy connection initiation request.

15. Apparatus as claimed in claim 2, wherein said computer-readable code when executed controls said at least one processor to perform at least one of:
include an address of said proxy device and an address of said source in said proxy setup request message; and
include data for connection setup in a payload of said proxy setup request message.

16. An apparatus as claimed in claim 2, wherein said computer-readable code when executed controls said at least one processor to cause said proxy device to, in response to receiving said connection request message from said target, await receipt of another proxy connection initiation receipt message from said source before sending said proxy setup request message addressed to said source.

17. A Bluetooth Low Energy (BLE)-enabled apparatus, said apparatus having at least one processor and at least one non-transitory memory having computer-readable code stored therein which when executed controls said at least one processor to cause said apparatus:
to send one or more BLE advertising messages addressed to a BLE-enabled target using an address of said target;

to respond to determining that no response to said advertising message has been received from said target by sending a proxy connection initiation request message, said proxy connection initiation request message being a request to provide a proxy and including said address of said target and an address of said apparatus; and to respond to receiving a proxy setup request message from a BLE-enabled proxy device, said proxy setup request message being addressed to said apparatus, by connecting to said proxy device.

18. Apparatus as claimed in claim 17, wherein said computer-readable code when executed controls said at least one processor to send advertising messages addressed to a target using an address of said target repeatedly until it is detected that a first timeout has expired or that a response has been received from said target.

19. Apparatus as claimed in claim 17, wherein said computer-readable code when executed controls said at least one processor to send proxy connection initiation request messages repeatedly until it is detected that a second timeout has expired or that said proxy setup request message has been received from said proxy.

20. Apparatus as claimed in claim 17, wherein said computer-readable code when executed controls said at least one processor to read an address of said proxy from said received proxy setup request message, and to connect to said proxy device conditional on said address of said proxy being included in a list of permitted proxy addresses.

21. Apparatus as claimed in claim 17, wherein said computer-readable code when executed controls said at least one processor to include at least one of said address of said target and said address of said apparatus in a payload of said proxy connection initiation request.

22. Apparatus as claimed in claim 17, wherein at least one of the following:
   a) said proxy setup request message includes an address of said proxy and an address of said apparatus, or
   b) said proxy setup request message includes data for connection setup in a payload thereof.

23. A method, comprising:
   sending one or more Bluetooth Low Energy (BLE) advertising messages addressed to a BLE-enabled target using an address of said target;

responding to determining that no response to said advertising message has been received from said target by sending a proxy connection initiation request message, said proxy connection initiation request message being a request to provide a proxy and including said address of said target and an address of a source of said one or more advertising messages; and responding to receiving a proxy setup request message from a BLE-enabled proxy device, said proxy setup request message being addressed to a source of said one or more advertising messages, by connecting to said proxy device.

24. A method as claimed in claim 23, further comprising sending advertising messages addressed to a target using an address of said target repeatedly until it is detected that a first timeout has expired or that a response has been received from said target.

25. A method as claimed in claim 23, further comprising sending proxy connection initiation request messages repeatedly until it is detected that a second timeout has expired or that said proxy setup request message has been received from said proxy.

26. A method as claimed in claim 23, further comprising reading an address of said proxy from said received proxy setup request message, and connecting to said proxy device conditional on said address of said proxy being included in a list of permitted proxy addresses.

27. A method as claimed in claim 23, further comprising including at least one of said address of said target and said address of said source of said one or more advertising messages in a payload of said proxy connection initiation request.

28. A method as claimed in claim 23, wherein at least one of the following:
   a) said proxy setup request message includes an address of said proxy and an address of said source of said one or more advertising messages, or
   b) said proxy setup request message includes data for connection setup in a payload thereof.

* * * * *